US008745837B2

(12) United States Patent
Bensussan et al.

(10) Patent No.: US 8,745,837 B2
(45) Date of Patent: Jun. 10, 2014

(54) LOCKING SYSTEM FOR CONNECTING POLES AND TOOLS

(75) Inventors: Bernard Leon Bensussan, Monroe, CT (US); Ronald Michael Callanan, Seymour, CT (US)

(73) Assignee: Unger Marketing International, LLC, Bridgeport, CT (US)

(*) Notice: Subject to any disclaimer, the term of this patent is extended or adjusted under 35 U.S.C. 154(b) by 1316 days.

(21) Appl. No.: 12/455,447

(22) Filed: Jun. 2, 2009

(65) Prior Publication Data

US 2009/0235512 A1 Sep. 24, 2009

Related U.S. Application Data

(62) Division of application No. 11/271,691, filed on Nov. 10, 2005, now Pat. No. 7,549,195.

(51) Int. Cl.
*B23P 11/00* (2006.01)

(52) U.S. Cl.
USPC .................. 29/436; 29/242; 15/145; 215/221; 16/422; 285/88

(58) Field of Classification Search
USPC ........... 29/436, 242, 234, 237; 15/145, 143.1; 215/216, 221; 403/105, 109.1, 109.4, 403/109.5, 109.8, 111, 330, 377; 16/422; 285/2, 87, 88, 89, 92, 308, 312, 317, 285/319, 320; 411/128
See application file for complete search history.

(56) References Cited

U.S. PATENT DOCUMENTS 1,407,327 A 2/1922 Giles .............................. 279/100
3,409,319 A 11/1968 Van Hecke ..................... 403/320
3,524,210 A 8/1970 McLean
3,917,097 A 11/1975 Uhlig
3,989,152 A * 11/1976 Julian ........................... 215/216
4,541,139 A 9/1985 Jones et al. ...................... 15/171
4,642,837 A * 2/1987 Nichols et al. .................. 15/171
4,768,258 A 9/1988 Langestein ..................... 16/429
5,161,278 A 11/1992 Tomm .......................... 15/159.1
5,172,447 A 12/1992 Tomm .......................... 15/159.1
5,288,161 A 2/1994 Graves et al. ................. 403/324
5,366,314 A 11/1994 Young ........................... 403/299
5,375,286 A * 12/1994 Harrah .......................... 15/147.1
5,385,420 A 1/1995 Newman, Sr. et al. ........ 403/299

(Continued)

FOREIGN PATENT DOCUMENTS

DE 3901283 8/1989 .............. F16C 11/04
GB 2209301 8/1988 ............... B25G 3/18

OTHER PUBLICATIONS

International Search Report based on PCT/US2006/43638 dated Aug. 15, 2007.
Written Opinion based on PCT/US2006/43638 dated Aug. 15, 2007.

(Continued)

*Primary Examiner* — David Bryant
*Assistant Examiner* — Christopher M Koehler
(74) *Attorney, Agent, or Firm* — Ohlandt, Greeley, Ruggiero & Perle, L.L.P.

(57) ABSTRACT

A locking system for connecting a handle and an implement is provided. The locking system includes a handle having a first thread and a first locking member and an implement having a second thread and a second locking member. The first and second threads are threadably engaged so that the first and second locking members selectively lock the handle to the implement.

7 Claims, 5 Drawing Sheets

(56) References Cited

U.S. PATENT DOCUMENTS

| | | | | |
|---|---|---|---|---|
| 5,449,077 | A | 9/1995 | Seidler | 215/216 |
| 5,460,281 | A | 10/1995 | Rapchak et al. | 215/216 |
| 5,544,768 | A | 8/1996 | Gargione | 215/209 |
| 5,586,671 | A | 12/1996 | Thomas et al. | 215/209 |
| 5,687,863 | A | 11/1997 | Kusz | 215/216 |
| 5,706,963 | A | 1/1998 | Gargione | 215/219 |
| 5,842,810 | A | 12/1998 | Morad | 403/301 |
| 5,865,330 | A * | 2/1999 | Buono | 215/216 |
| 5,908,125 | A | 6/1999 | Opresco | 215/216 |
| 5,927,526 | A | 7/1999 | Herr | 215/216 |
| 6,036,036 | A * | 3/2000 | Bilani et al. | 215/216 |
| 6,112,921 | A * | 9/2000 | Robinson | 215/216 |
| 6,161,242 | A | 12/2000 | Cabrero Gomez et al. | 15/147.1 |
| 6,349,451 | B1 | 2/2002 | Newman et al. | 16/427 |
| 6,357,615 | B1 * | 3/2002 | Herr | 215/216 |
| 6,425,705 | B1 * | 7/2002 | Ingram | 401/290 |
| 6,461,075 | B2 | 10/2002 | Bickel | 403/409.1 |
| 6,553,628 | B2 | 4/2003 | Newman et al. | 16/427 |
| 6,824,180 | B2 | 11/2004 | Tomchak | 294/57 |
| 6,925,686 | B2 | 8/2005 | Heathcock et al. | 16/429 |
| 6,952,862 | B2 | 10/2005 | Axelsson | 16/422 |
| 7,774,889 | B2 * | 8/2010 | Weaver | 15/145 |
| 2003/0103803 | A1 | 6/2003 | Axelsson | 403/292 |
| 2003/0233718 | A1 | 12/2003 | Heathcock et al. | 15/144.4 |

OTHER PUBLICATIONS

Extended European Search Report dated Jul. 7, 2010 for corresponding European Patent Application No. 06837240.8.

International Preliminary Report on Patentability based on PCT/US2006/43638 dated Mar. 23, 2010.

* cited by examiner

LOCKING SYSTEM FOR CONNECTING POLES AND TOOLS

CROSS REFERENCE TO RELATED APPLICATIONS

This application is a divisional application Ser. No. 11/271,691 filed Nov. 10, 2005, which issued as U.S. Pat. No. 7,549,195 on Jun. 23, 2009.

BACKGROUND OF THE INVENTION

1. Field of the Invention

The present disclosure is related to a locking system for connecting a handle or pole (hereinafter “handle”) to an implement or tool (hereinafter “implement”). More particularly, the present disclosure is related to a system for selectively locking and unlocking a threaded connection between a handle and an implement.

2. Description of Related Art

It is often desirable to use an extension handle in conjunction with an implement to reach places that are otherwise hard to reach. For example, a painter may use an extension handle in conjunction with a paint roller to paint high walls or ceilings. Or, for example, a person may use an extension handle in conjunction with a mop head in order to more easily clean floors. There are many situations and tasks that can be simplified by attaching an extension handle to an implement.

It is desirable that the system also provides a means for quickly and easily detaching the extension handle from the implement. This feature not only facilitates packaging and storage but it also enables suppliers to keep a stock of similar handles, which may be supplied for use with a variety of implements.

This is also beneficial for a consumer who may only need to buy one or a small number of handles for use with a variety of tools in varying situations. An additional benefit to being able to quickly detach the handle from the implement, reveals itself when either part is damaged or breaks. One can simply detach the two parts and replace the part that is malfunctioning.

Currently, a number of systems for connecting a handle and an implement are being sold. In one common system, the handle has an externally threaded spigot that may be screwed into an internally threaded socket on the implement. For cheapness and ease of manufacture, the components are often formed from plastics.

Unfortunately, use of the implement often results in forces on the implement that are sufficient to unthread the implement from the handle.

Many complex and/or difficult to operate systems have been proposed to lock the implement to the tool to prevent the implement from unthreading from the handle during use.

However, there is a need for a system having a minimal number of parts that will quickly and easily thread and lock a handle and an implement to one another.

BRIEF SUMMARY OF THE INVENTION

It is an object of the present disclosure to provide a locking system for connecting a handle and an implement.

It is another object to provide a method of selectively locking a handle and an implement to one another.

These and other objects and advantages of the present disclosure are provided by a locking system for connecting a handle and an implement. The locking system includes a handle having a first thread and a first locking member and an implement having a second thread and a second locking member. The first and second threads are threadably engaged so that the first and second locking members selectively lock the handle to the implement.

A locking system is also provided that includes a handle having a first thread and a locking arm and an implement having a second thread and a locking tooth. The first and second threads are threadably engageable with one another upon rotation in a first direction and threadably disengageable with one another upon rotation in a second direction. The locking arm moves from a first position to a second position during rotation in the first direction and elastically returns to the first position upon engagement of the first and second threads to a predetermined point. The locking tooth and the locking arm prevent rotation in the second direction beyond the predetermined point when the locking arm in the first position.

A locking system is also provided that includes a handle having a first thread and a locking tooth and an implement having a second thread and a locking arm. The first and second threads are threadably engageable with one another upon rotation in a first direction and threadably disengageable with one another upon rotation in a second direction. The locking arm moves from a first position to a second position during rotation in the first direction and elastically returns to the first position upon engagement of the first and second threads to a predetermined point. The locking tooth and the locking arm prevent rotation in the second direction beyond the predetermined point when the locking arm in the first position.

A method of connecting a handle and an implement is also provided. The method includes rotating one of the handle or the implement in a first direction to threadably engage the handle and the implement, moving a locking arm to about pivot axis from a first position to a second position as a result of the rotation in the first direction, returning the locking arm elastically to the first position upon rotation in the first direction to a predetermined point, and preventing rotation in a second direction beyond the predetermined point with the locking arm in the first position, wherein the second direction is opposite the first direction.

The above-described and other features and advantages of the present invention will be appreciated and understood by those skilled in the art from the following detailed description, drawings, and appended claims.

DETAILED DESCRIPTION OF THE INVENTION

Figure 1:
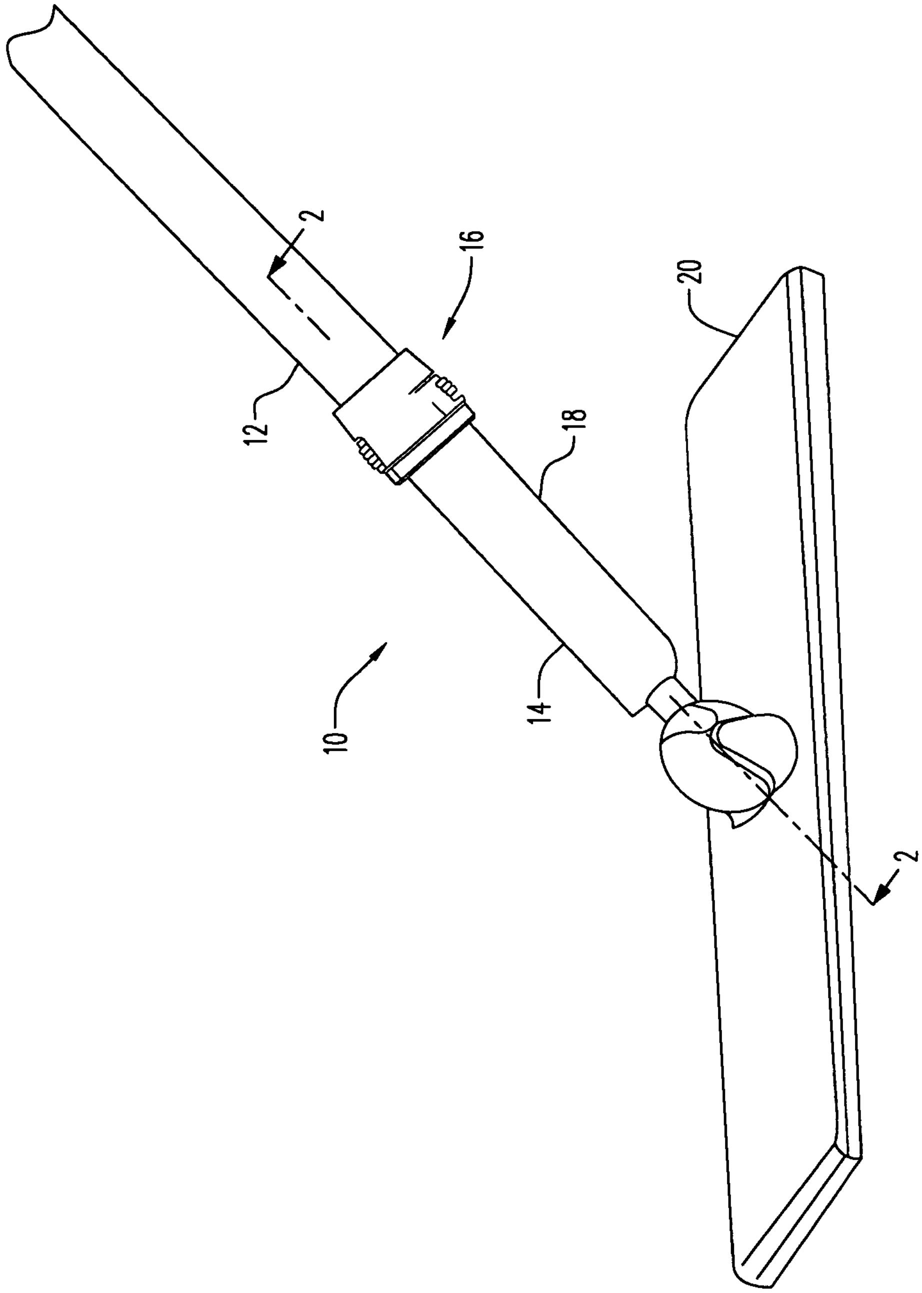
FIG. 1 is a side perspective view of a working device having an exemplary embodiment of a locking system according to the present disclosure.
Figure 2:
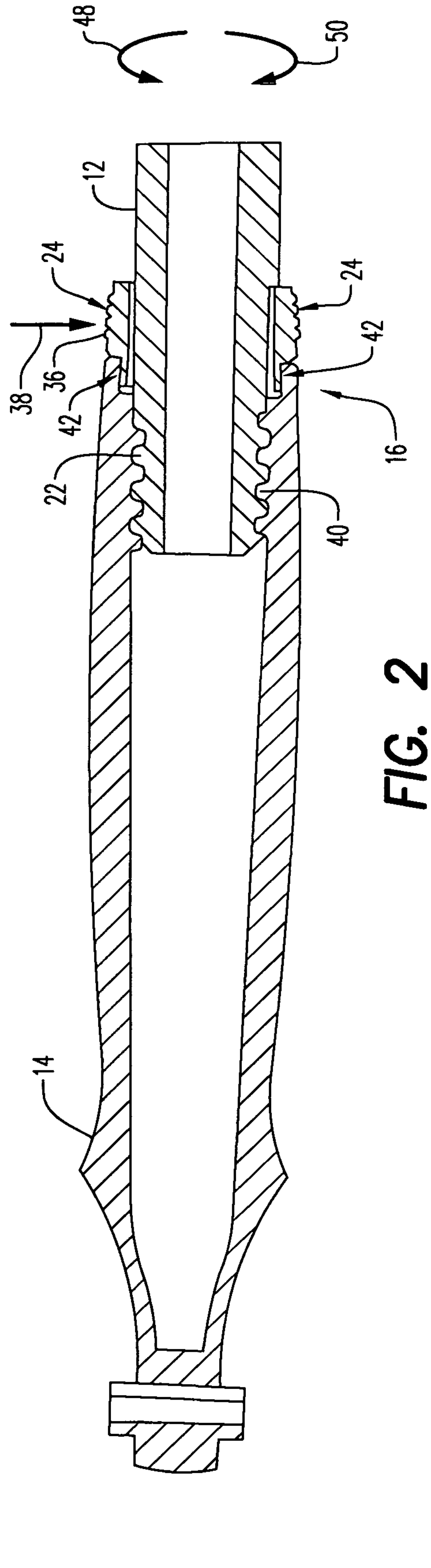
FIG. 2 is a sectional view of the locking system of FIG. 1, taken along lines 2-2.
Figure 3:
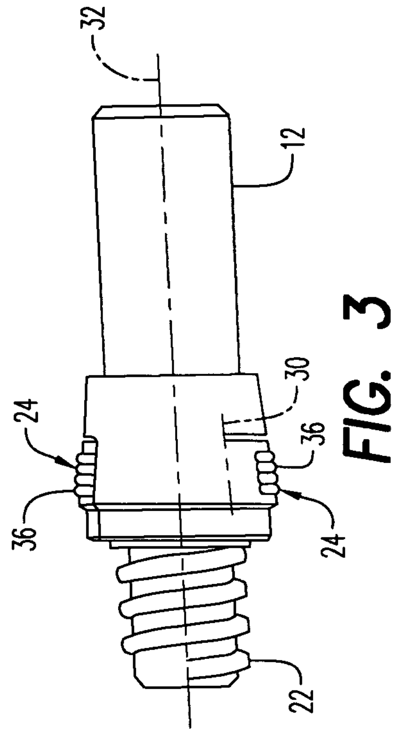
FIG. 3 is a side view of the handle shown in FIG. 1.

Referring to the drawings and in particular to FIG. 1, a working device 10 having a handle 12 and an implement 14 is shown. Advantageously, working device 10 includes a locking system 16 for selectively locking and unlocking handle 12 and implement 14 to one another.

In the illustrated embodiment, working device 10 is illustrated as a dust mop such as that shown and described in commonly owned and assigned U.S. patent Ser. No. 10/896,246, the contents of which are incorporated by reference herein. Of course, it should be recognized that working device 10 can be any combination of any known device having handle 12 engaged with implement 14.

In the illustrated embodiment, implement 14 includes a connecting part 18 and a working part 20. Of course, it should be recognized that implement 14 can be any number of components to be engaged to handle 12.

It has been determined that there is a need for locking system 16 that can quickly and easily connect and disconnect handle 12 and implement 14 from one another.

Locking system 16 is described with simultaneous reference to FIGS. 2 through 7.

Handle 12 includes a first thread 22 and at least one locking arm 24. In the illustrated embodiment, handle 12 is illustrated having two locking arms 24. Of course, it is contemplated by the present disclosure for handle 12 to have as many locking arms 24 as are necessary to selectively lock the handle and implement 14 to one another.

Figures 4, 5A, 5B, 5C:
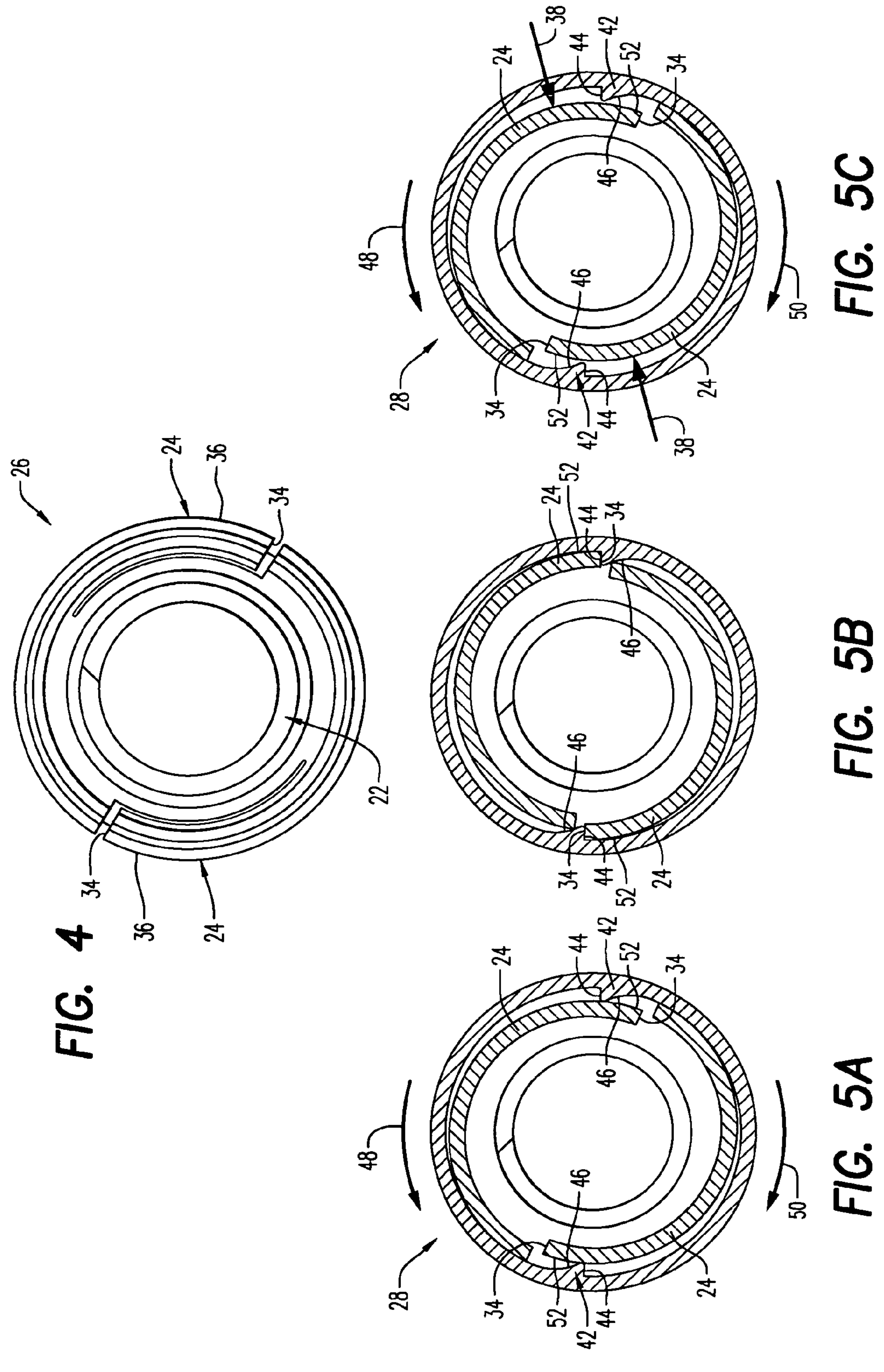
FIG. 4 is a first end view of the handle shown in FIG. 1.
FIG. 5A is a partial cross sectional view of the connecting part shown in FIG. 1 illustrating the locking arms in the second position.
FIG. 5B is a partial cross sectional view of the connecting part shown in FIG. 1 illustrating the locking arms in the first position.
FIG. 5C is a partial cross sectional view of the connecting part shown in FIG. 1 illustrating the locking arms in the second position upon application of a releasing force.

Each of the locking arms 24 is configured to move between a first or locking position 26 (FIGS. 4 and 5B) and a second or releasing position 28 (FIG. 5A). Arms 24 are normally biased to first position 26, but can flex inward along a pivot axis 30 to second position 28. In the illustrated embodiment, pivot axis 30 is generally parallel to a longitudinal axis 32 of handle 12. Of course, it is contemplated by the present disclosure for pivot axis 30 to be generally perpendicular to longitudinal axis 32.

Each locking arm 24 includes a first locking surface 34 and a releasing button 36. First locking surface 34, as described in detail below, interacts with implement 14 to selectively lock handle 12 to the implement when locking arm 24 is in first position 26. Releasing button 36 allows a user to apply a releasing force 38 (FIG. 2) to locking arm 24 to move the locking arm to second position 28 (FIG. 5C). First locking surface 34, as described in detail below, is disengaged from implement 14 to selectively release handle 12 from the implement when locking arm 24 is in second position 28. Upon release of releasing force 38, locking arm 24 returns to first position 26.

Figure 6:
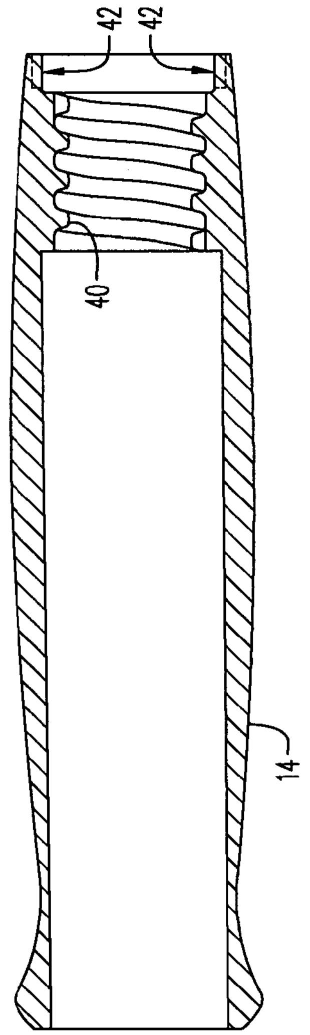
FIG. 6 is a partial sectional view of the implement shown in FIG. 1.
Figure 7:
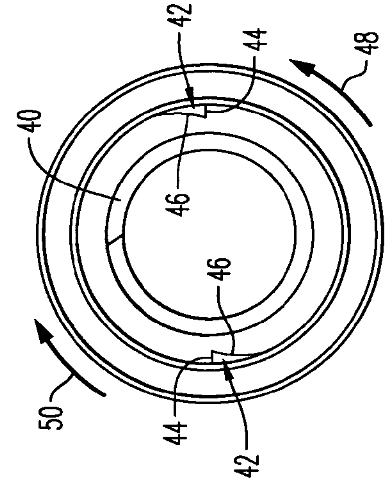
FIG. 7 is an end view of the implement shown in FIG. 1.

Implement 14 includes a second thread 40 and at least one locking tooth 42 in proximity thereto. Preferably, implement 14 includes locking teeth 42 that correspond in number to the number of locking arms 24 of handle 12. In the embodiment where handle 12 includes two locking arms 24, implement 14 includes two locking teeth 42 (FIGS. 6 and 7). In addition, it is preferred that locking teeth 42 are equidistantly spaced from one another.

Each locking tooth 42 includes a second locking surface 44 and a cam surface 46. Second locking surface 44 abuts first locking surface 34, when locking arm 24 is in first position 26 (FIG. 5B). In this position, locking arm 24 interferes with locking tooth 42, which prevents rotation of implement 14 and handle 12 with respect to one another in an unthreading direction 48. However, second locking surface 44 does not interfere with first locking surface 34, when locking arm 24 is in second position 28 (FIG. 5A). In this position, implement 14 and handle 12 can be rotated with respect to one another in unthreading direction 48 and, thus, allows the implement and handle to be disconnected from one another.

Cam surface 46 is configured to move locking arm 24 from first position 26 to second position 28 during rotation of implement 14 and handle 12 with respect to one another in a threading direction 50. During rotation of implement 14 and handle 12 with respect to one another in a threading direction 50, cam surface 46 acts on an outer surface 52 of locking arm 24 to flex the locking arm about pivot axis 30 to second position 28. Once implement 14 and handle 12 have been rotated with respect to one another in threading direction 50 to the point where cam surface 46 no longer acts on outer surface 52, locking arm 24 flexes about pivot axis 30 and returns to its first position 26.

During use, first thread 22 of handle 12 is inserted into second thread 40 of implement 14. Handle 12 and implement 14 are rotated in threading direction 50 so that first and second threads 22, 40 engage one another. As the rotation continues, cam surface 46 contacts outer surface 52 of locking arm 24, which moves the locking arm 24 about pivot axis 30 to second position 28. Once first locking surface 34 is clear of second locking surface 44, locking arm 24 elastically flexes back to first position 26, preventing rotation of handle 12 and implement 14 with respect to one another in unthreading direction 48.

Thus, the application of torque in unthreading direction 48 results in first and second locking surfaces 34, 44 abutting one another. The contact between first and second locking surfaces 34, 44 prevents handle 12 and implement 14 from being threadably disengaged from one another.

To threadably disengage handle 12 and implement 14, releasing force 38 can be applied to button 36 on locking arm 24. Releasing force 38 moves locking arms 24 inward about pivot axis 30 to second position 28. In second position 28, first and second surfaces 34, 44 will no longer interfere with one another, allowing rotation of handle 12 and implement with respect to one another in unthreading direction 48.

Thus, locking system 16 includes a minimum of parts that can be used to simply and quickly lock and unlock handle 12 and implement 14 from one another.

It should be recognized that locking system 16 is illustrated above by way of example where handle 12 includes locking arm 24 and implement 14 includes locking tooth 42. Of course, it is contemplated by the present disclosure for handle 12 to include locking tooth 42 and implement 14 to include locking arm 24, or any combinations thereof.

Figure 8:
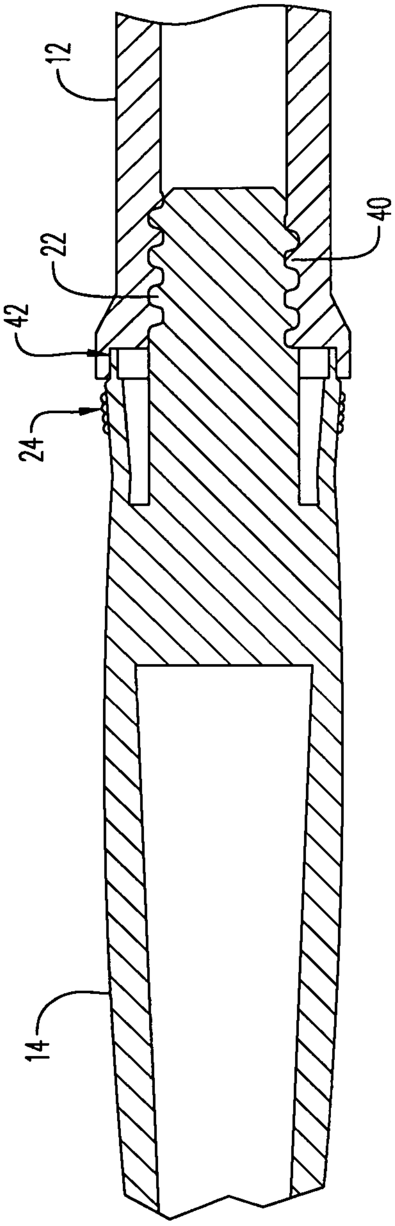
FIG. 8 is a sectional view of an alternate exemplary embodiment of the system of FIG. 1.

It also should be recognized that locking system 16 is illustrated above by way of example where locking arm 24 is illustrated on the male threaded portion and locking tooth is illustrated on the female thread. Of course, it is contemplated by the present disclosure for any locking tooth 42 and locking arm 24 to be positioned as desired with respect to the male and female threads as shown in FIG. 8.

It is foreseen that the implement and the handle can be made of a variety of materials. For example, each part can be made of plastic, wood, or metal.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A method of connecting a pole and a tool, comprising:

rotating one of the pole or the tool in a first direction to threadably engage the pole and the tool, said pole having a first axis defined along a length thereof;

moving, as a result of rotating in said first direction, a locking arm from a first position about a pivot axis that is perpendicular to said first axis so that said locking arm moves from a first position to a second position;

returning said locking arm about said pivot axis elastically to said first position upon rotation in said first direction to a predetermined point; and preventing rotation in a second direction beyond said predetermined point with said locking arm in said first position, wherein said second direction is opposite said first direction.

2. The method of claim 1, wherein rotation in said second direction causes a portion of said locking arm to abut against a locking tooth so that rotation in said second direction beyond said predetermined point is prevented.

3. The method of claim 1, further comprising applying a releasing force to said locking arm to move said locking arm from said first position to said second position while rotating in said second direction so that rotation in said second direction beyond said predetermined point is not prevented.

4. The method of claim 3, wherein the step of applying said releasing force comprises applying a force to said locking arm in a direction radially inward toward said pole.

5. A method of connecting a pole and a tool, comprising:

rotating one of the pole or the tool in a first direction to threadably engage the pole and the tool, the pole having a first axis defined along a length thereof;

moving a locking arm outward from said first axis from a first position to a second position as a result of rotating in said first direction;

returning said locking arm to said first position elastically inward towards said first axis upon rotation in said first direction to a predetermined point;

preventing rotation in a second direction beyond said predetermined point with said locking arm in said first position, wherein said second direction is opposite said first direction; and applying a releasing force to said locking arm inward towards said first axis to move said locking arm outward from said first axis until said locking arm is in said second position while rotating one of the pole or the tool in said second direction so that rotation in said second direction beyond said predetermined point is not prevented.

6. The method of claim 5, wherein said locking arm moves outward from said first axis and inward towards said first axis about a pivot axis that is parallel to said first axis.

7. The method of claim 5, wherein said locking arm moves outward from said first axis and inward towards said first axis about a pivot axis that is perpendicular to said first axis.

* * * * *